United States Patent Office 2,761,692
Patented Sept. 4, 1956

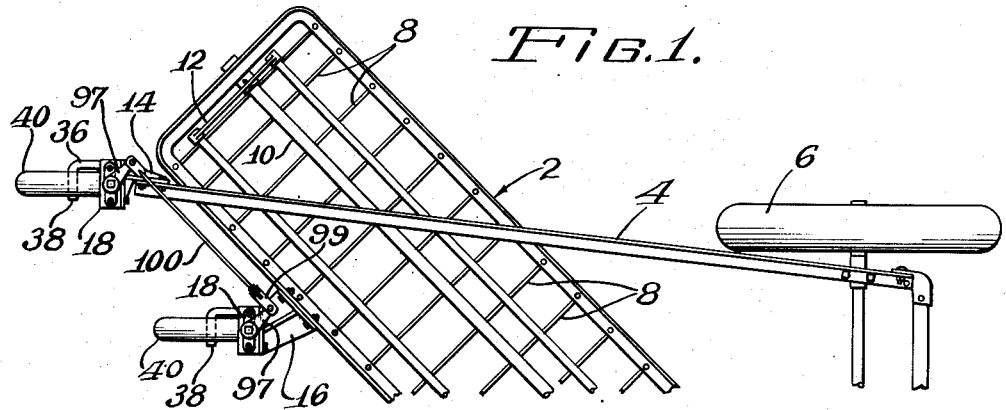
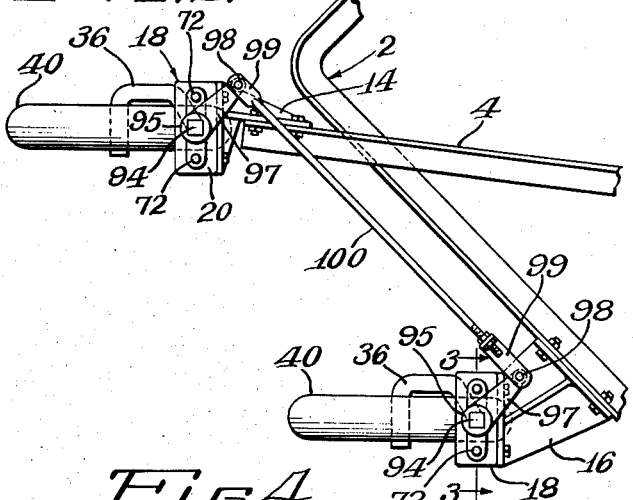
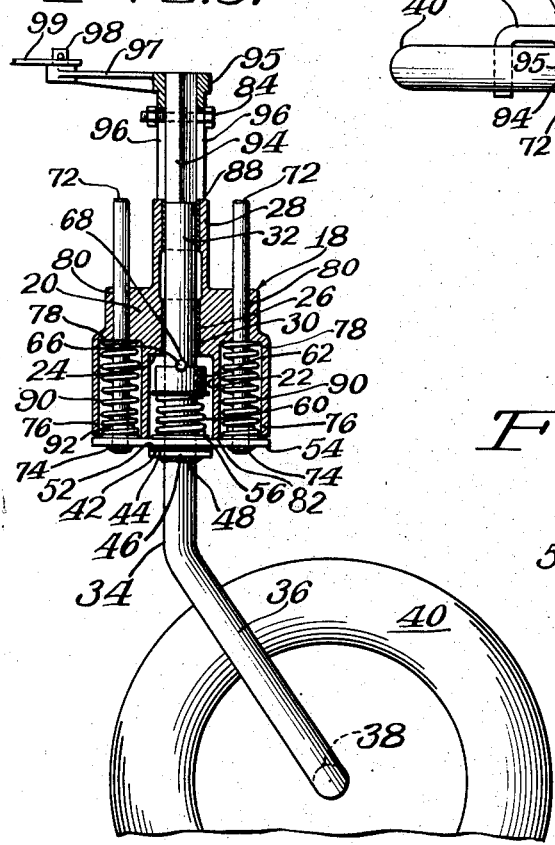
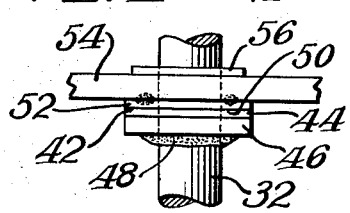

2,761,692

CASTER WHEEL ASSEMBLY FOR IMPLEMENT CARRIERS

Michael S. Sisulak, Chicago, Ill., assignor to International Harvester Company, a corporation of New Jersey Application June 2, 1952, Serial No. 291,251

4 Claims. (Cl. 280—62)

This invention appertains to an improvement in side delivery rakes of the type having a frame disposed diagonally to the line of draft of the machine. The frame of such a machine, in current designs, is carried by wheels at its front end and by a freely rotatable, trailing caster wheel or wheels at its rear end. In such machines heretofore provided with trailing caster wheels, the caster wheels continuously shimmied laterally which resulted in their rapid wear, and developed serious vibrations in the machine and at the same time materially increased its draft. In addition, such machines had a tendency to wander and thus impose high stresses upon the hitching members as well as complicating the steering of the unit.

Having these deficiencies in mind, it is an object of this invention to provide in a machine of the type mentioned, a novel caster wheel assembly which will obviate these difficulties and which is of durable and inexpensive construction and which may be readily incorporated in machines of various designs.

A more specific object of the invention is to provide a caster wheel assembly incorporating novel friction control means for eliminating the shimmying effect while at the same time accommodating full castering of the wheel.

The invention contemplates a novel caster wheel assembly wherein the wheel is connected to a spindle provided with a friction surface spring pressed into frictional engagement with a cooperating friction surface associated with the supported framework.

A still further object of the invention is to provide a friction control between the spindle of the caster wheel and the supported framework wherein the friction means and the caster wheel are accommodated in unimpaired vertical floating movements.

A still further object is to design a caster wheel arrangement wherein the assembly is continuously biased downwardly by a spring means acting between the supported framework and the caster wheel assembly so that the caster wheel is caused to always dispose in rolling contact with the terrain irrespective of the undulations thereof.

A still further object of the invention is to devise simple friction means incorporating a friction disc fixedly connected to the spindle and engaging a friction plate member floatingly interlocked with the framework and spring urged downwardly by resilient means reacting thereagainst and against the framework supported thereby.

A different object of the invention is to devise a friction assembly having simple and inexpensive parts which may be easily replaced.

Another object is to provide a novel connection between the two caster wheels so they operate together, the connection accommodating relative movement between the two wheels without affecting their disposition.

These and other objects of the invention will become more apparent from the specification and the drawings, wherein:

Figure 1 is a fragmentary plan view of a side delivery hay rake showing the improved caster wheel controlling device applied thereto;

Figure 2 is an enlarged detailed view showing the improved caster wheel controlling device in plan;

Figure 3 is an elevational view of one of the caster wheels with the friction assembly shown in vertical section; and Figure 4 is an enlarged view showing the engaging friction members.

The side delivery rake chosen for purpose of illustrating the invention and as shown in Figure 1 is conventional and is of that type comprising an implement carrier herein shown as a frame 2 diagonally disposed to the line of draft of the machine. The end of the frame shown is attached to a truss beam 4 comprising a main frame of the machine and carried at its forward end by an axle and supporting wheel 6 at each end of the axle. The diagonally disposed frame 2 is rectangular in shape, as shown, and carries the usual stripper bars 8 and rotatable shaft 10, on which is supported the raking cylinder 12.

Bolted to the rear end of the truss beam 4 is a bracket 14, and, spaced from this a suitable distance and bolted to the rear side of the rectangular frame 2, is another bracket 16. Of course, the framework and attachment of the brackets 14 and 16 may be varied to suit any particular design.

Each bracket or attachment member 14 or 16 connects or bolts to a casting 18 or bearing having a body portion 20 with a central downwardly open bore 22 terminating at its upper end in a shoulder 24 intermediate the top and bottom ends of the body 20 and then continued coaxially as a bore section 26 of reduced diameter, the section 26 continuing through a sleeve 28 formed integral with the upper end of the body 20 and extending upwardly therefrom. The bore section 26 is provided with bushings 30 which afford a journal for a shank 32 of a spindle or stem 34 extending through the bore 26 and the bore 22, the shank 32 being substantially vertically disposed and at its lower end merging into a downwardly angled arm 36 which at its lower end is provided with a generally horizontal stub axle 38 affording a journal for the caster wheel 40.

The shank 32 is provided intermediate its ends with an upwardly facing friction surface 42 (Figs. 3 and 4), which is provided on a friction element 44 sleeved about the shank 32 with a support plate 46 therebeneath, the plate 46 being weld-connected on its bottom side as at 48 to the shank 32. Of course the element 44 and plate 46 may be one, however, the member 44 is preferably of cast iron to provide a high coefficient of friction. The surface 42 engages a downwardly facing friction surface 50 on a friction member 52, which is sleeved about shank 32 with a mounting plate 54 thereabove and preferably attached to the under side thereof as by spot welding. The member 52 and plate 54 constitute part of a friction assembly and may be one however, member 52 is preferably cast iron. The plate 54 is disposed beneath the casting 18 and mounts upon its top side a wear-member or washer 56 which is ensleeved about the shank 32, the top side of the member 56 affording a seat for the bottom end of a compression spring 60 which ensleeves the shank and at its upper end is seated or buttressed against the bottom end of abutment member 62, the abutment member 62 being in the form of a collar sleeved about the shank 32 and held in compressing relationship to the spring by means of a locking pin 66 thereabove, the pin 66 extending through a transverse opening 68 in the shank 32 and on its bottom side seating within a complementary depression in the upper margin of the collar 62. It will thus readily be seen that the friction elements 44 and 52 are urged into constant frictional engagement with each other.

The plate or friction member 54 is provided at each end with upstanding positioning and interlocking members or pins 72, 72, each member 72 extending through a complementary opening in the plate and at its lower end weld-connected as at 74 to the under side of the plate. Each pin 72 extends upwardly through the center of a downwardly open bore 76 formed in the body portion 20, the bores 76, 76 flanking the bore 22 and at their upper ends terminating in shoulders 78 located intermediate the top and bottom sides of casting 18. Each bore 76 communicates at its upper end with a coaxial bore 80 extending upwardly therefrom through the top end of the casting in close confinement to the related pin 72 which projects through the upper end of the casting and extends a substantial distance upwardly therefrom. The pins 72, 72 interlock the plate 54 with the casting 18, which in fact is part of the framework, to prevent relative rotational movement of the plate 54 with respect to the casting. However, the plate 54 together with pins 72, 72 is accommodated for relative vertical movement in an upward direction until the top side of the plate abuts as at 82 against the bottom edge of the casting about the opening 22. The downward movement of the plate 54 with the caster wheel spindle is limited by an abutment 84 in the form of a pin connected to the upper end of the spindle shank 32, the pin 84 being abuttable with the upper edge 88 of the cylindrical extension 28 at the upper end of the casting.

The casting and the framework are spring supported from the caster wheels by means of springs 90, 90 which are disposed within the respective openings 76, 76, each spring ensleeving the related pin 72 and positioned thereby and at its lower end seated against the top side of the plate 54 about a spring positioning boss 92 sleeved on the pin 72 and preferably connected to the plate 54. Each spring 90 seats at its upper end against the related shoulder 78 and is stressed in compression between the shoulder 78 and the plate 54, whereby constantly urging the caster wheel downwardly and floatingly supporting the framework. These springs 90 also urge the plate 54 against plate 46. The axes of springs 90, 90 and shank 32 are disposed in a vertical plane substantially normal to the line of draft. The springs 90, 90 are thus located to prevent the shank from tilting sidewise upon wear of the bushings.

It will be seen that the friction assembly provides constant friction control irrespective of the vertical movements of the frame of the rake and permits 360° frictionally resisted relative rotation between members 32 and 20. Furthermore, the arrangements of the parts are extremely simple and the springs and friction assembly are protected by being housed within the casting. The upper end 94 of each shank 32 is preferably square or non-round in cross-section and is ensleeved by a complementary sleeve 95 telescoped thereover, the sleeve 95, being supported by the frame by seating at its bottom edge on the edge 88 of the extension 28 therebelow and the sleeve 95 being longitudinally slotted at 96, 96 to accommodate pin 84 therethrough and forming a lost-motion connection, whereby shank 32 is vertically movable relative to sleeve 95 but interlocked for rotation therewith. Each sleeve 95 is formed with an integral laterally extending arm or crank 97 provided with an upstanding pin 98 on its outer end, and pivotally connected to the pin 98 on each crank end is the flattened end portion 99 of a longitudinally adjustable right connecting link 100 interconnecting the crank arms of both. Thus, both caster wheels are interconnected to move in unison and each is independently vertically floating with respect to the other, and each provides frictional control of the movements of both caster wheels.

What is claimed is:

1. In an implement support structure having an implement supporting frame, a front wheel support for the frame, a caster wheel assembly supporting the rear end of the frame and comprising a bracket connected to the frame, said bracket having a central vertical opening with a bushed upper portion and a pair of laterally spaced openings flanking said central opening, a caster wheel spindle having a shank journaled in said upper bushed portion, friction means located partially within the lower portion of said central opening and including a spring ensleeved about the shank and disposed within said lower part of said central opening, a friction plate ensleeved about the shank and disposed beneath said bracket in covering relationship to all of said openings and in engagement with its upper side with the bottom end of said spring, abutment means connected to the shank in engagement with the upper end of the spring, a friction member rigidly secured to the shank and disposed beneath said friction plate and in frictional engagement on its upper side with the bottom side of the plate, said spring compressed between said abutment means and said plate and urging the latter into frictional engagement with said friction member, and resilient means within said laterally spaced openings reacting between the plate and opposed portions of said bracket whereby spring-supporting said bracket from the plate and urging the latter downwardly against said friction member.

2. An implement support structure according to claim 1 wherein the axes of said resilient means are disposed with the axis of said shank in a substantially common vertical plane extending generally normal to the line of draft of the structure.

3. A carrier having a frame, ground engaging means supporting one end of the frame, a caster wheel assembly supporting the other end of the frame and said assembly including a generally vertical spindle shank, a bearing member connected to the frame and having a vertical bore receiving said shank therethrough for journalling said assembly on a generally vertical axis, said bearing member having a pair of generally vertical openings at opposite sides of said bore, a friction plate fixed to said spindle and disposed beneath said bearing member, a friction assembly comprising a plate portion sleeved over said shank between said bearing member and said friction plate and in frictional engagement with the latter, a pair of pins connected to said plate portion and upstanding therefrom and passing respectively through said openings for interlocking said friction assembly with said bearing member against relative rotation while accommodating movement of said fricton assembly with said friction plate vertically to maintain engagement therewith irrespective of vertical movements of said caster wheel assembly, said bearing member presenting abutment surfaces opposing said plate portion and a compression spring ensleeved about the associated pin and compressed between said plate portion and respective opposed abutment surfaces on said bearing member, said springs resiliently supporting said frame from said caster wheel, and said spindle shank movable axially of said bearing with attendant variance in compression of said springs whereby varying the pressure of engagement between said plate portion and said friction plate.

4. The invention according to claim 3 and means for maintaining a predetermined constant pressure between said plate portion and said friction plate in supplementing relation to said pressure of said springs and comprising spring means reactively stressed between said spindle and said plate portion for urging the latter against said friction plate to provide a fixed frictional resistance to rotation of said caster wheel assembly.

References Cited in the file of this patent

UNITED STATES PATENTS 980,817    Moore  ---------------- Jan. 3, 1911

(Other references on following page)

UNITED STATES PATENTS

| | | |
|---|---|---|
| 1,239,603 | Kelley | Sept. 11, 1917 |
| 1,734,393 | Mowry | Nov. 5, 1929 |
| 1,739,716 | Fisher | Dec. 17, 1929 |
| 1,780,194 | Kende | Nov. 4, 1930 |
| 2,028,332 | Johnson | Jan. 21, 1936 |
| 2,057,655 | Anthony | Oct. 20, 1936 |
| 2,094,050 | Wachter | Sept. 28, 1937 |
| 2,306,179 | Mulholland | Dec. 22, 1942 |
| 2,560,726 | Jones et al. | July 17, 1951 |

FOREIGN PATENTS

| | | |
|---|---|---|
| 143,497 | Great Britain | Dec. 23, 1920 |